United States Patent
Brown et al.

(10) Patent No.: US 7,116,958 B1
(45) Date of Patent: Oct. 3, 2006

(54) INTERFERENCE REJECTION IN A RADIO RECEIVER

(75) Inventors: David A. Brown, Hatfield Heath (GB); William R. Kirkland, Kanata (CA); Steve A. Beaudin, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 496 days.

(21) Appl. No.: 10/211,661

(22) Filed: Aug. 2, 2002

(51) Int. Cl.
*H04B 1/06* (2006.01)

(52) U.S. Cl. ...................... 455/266; 455/339; 455/340; 455/296; 455/250.1; 455/249.1; 375/260

(58) Field of Classification Search ................ 455/266, 455/339, 340, 296, 250.1, 249.1, 306; 375/260
See application file for complete search history.

(56) References Cited

U.S. PATENT DOCUMENTS 5,790,587 A * 8/1998 Smith et al. ................ 375/147
6,389,059 B1 * 5/2002 Smith et al. ................ 375/141
6,614,806 B1 * 9/2003 Nanni ......................... 370/468
6,738,609 B1 * 5/2004 Clifford ...................... 455/296

* cited by examiner

*Primary Examiner*—Matthew D. Anderson
*Assistant Examiner*—Sanh Phu
(74) *Attorney, Agent, or Firm*—Barnes & ThornburgLLP

(57) ABSTRACT

The use of wideband or software defined radio is attractive in terms of cost reduction since it allows re-use of base stations for different transmission modes. However, wideband radio also introduces the problem of how to deal with high level interfering signals. Presently, such signals saturate parts of the receive circuit—typically the ADC. By detecting interference and determining its frequency, it is possible to tune a bandpass or bandpass with notch filter, to take the interfering signal out of the reception band of the receiver thereby taking the ADC out of saturation whilst retaining the ability to resolve low level signals.

11 Claims, 4 Drawing Sheets

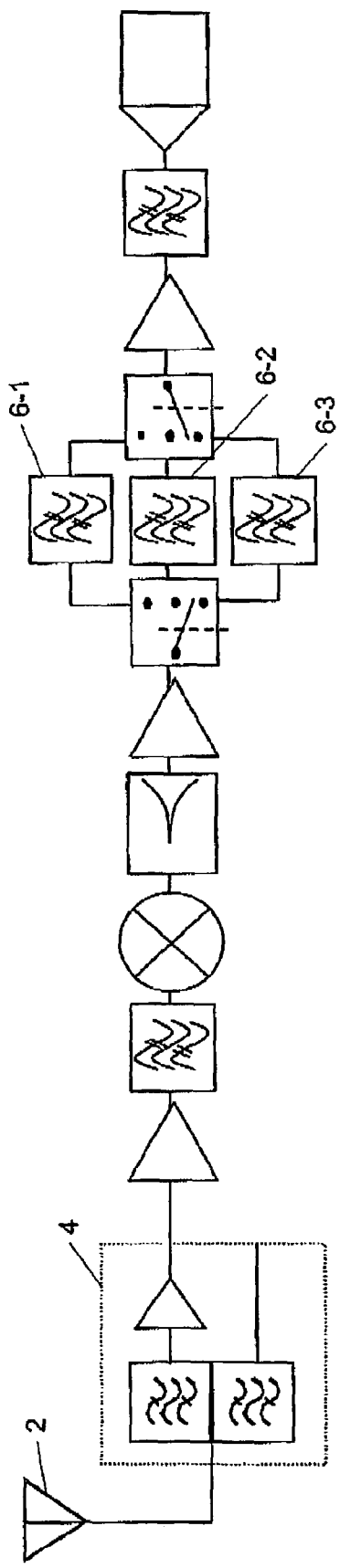
Figure 1A
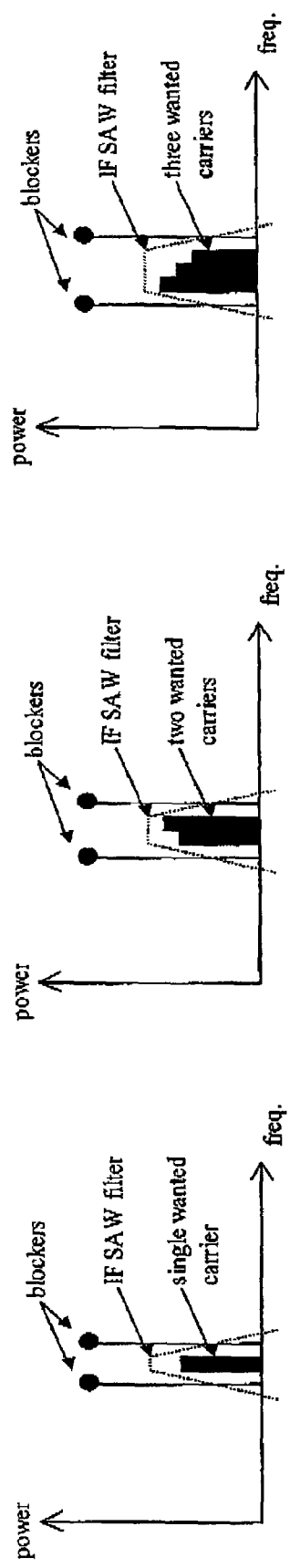
Figure 1B
Single-Carrier SAW
Figure 1C
2-Carrier SAW
Figure 1D
3-Carrier SAW

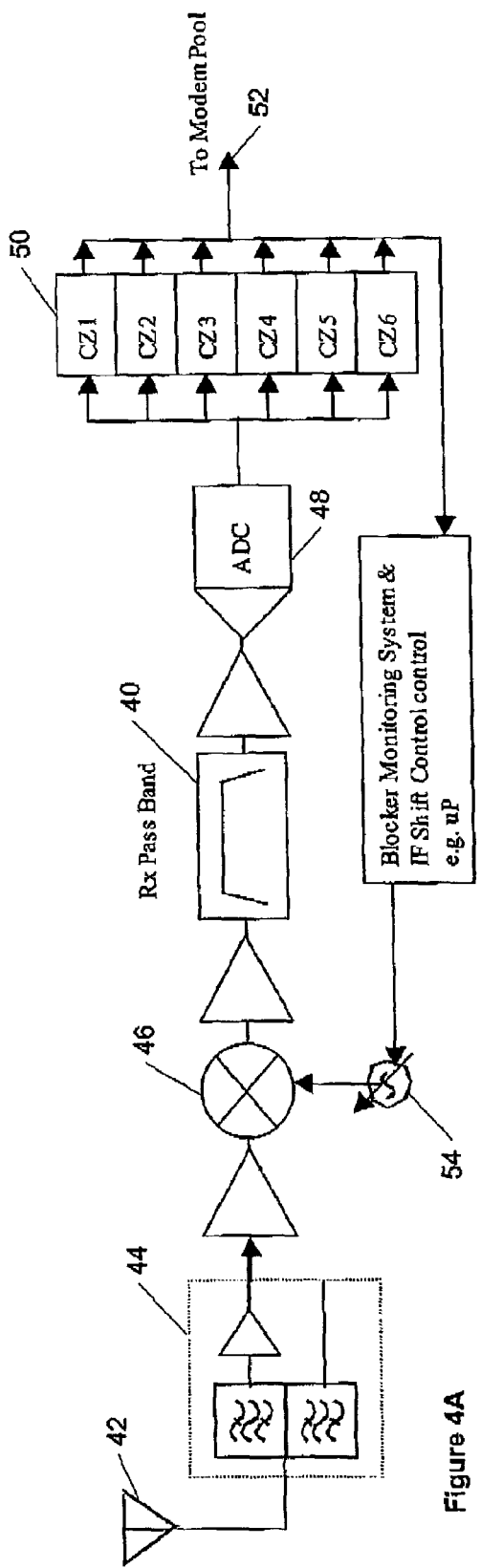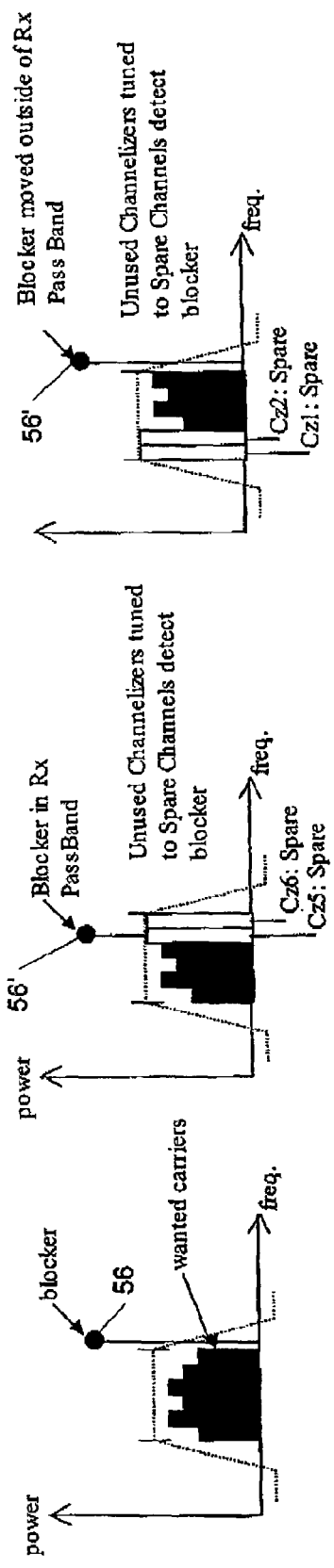

INTERFERENCE REJECTION IN A RADIO RECEIVER

FIELD OF THE INVENTION

This invention relates to apparatus and methods for providing rejection to interfering signals in a radio receiver. In particular, it relates to a radio signal receiving system that is capable of simultaneously detecting multiple signal channels in a wanted radio frequency band and multiple modulation modes whilst tuning filters at inteferers.

BACKGROUND TO THE INVENTION

Presently cellular base stations typically use one receiver per channel and a unique receiver design per mode. Wideband radio receivers capable of multiple channel and multiple modes (e.g. GSM, UMTS, CDMA) represent a promising technology for cellular base stations. However, the application of wideband receiver, otherwise known as software defined radio (SDR), technology to cellular base station design, whilst representing a promising technology for providing low cost multiple channel and multiple mode receivers, has been impeded due to the inability to provide the required dynamic range.

A limitation in applying wideband receiver technology to cellular base station design is that of insufficient dynamic range in the analogue to digital converter (ADC) to cope with interfering signals. The problem is manifest in the simultaneous detection of multiple channel radio signals of multiple modes when interfering signals from one of the modes are at such a level that they block the wanted receive radio frequency band by saturating the analogue to digital converter.

The conventional approach involves the use of switched surface acoustic wave (SAW) filters of varying bandwidths as shown in FIG. 1. By switching the filters, the interfering signal can be taken out of the passband. However, multiple filters and switches increase costs and the use of narrower filters means that wideband reception is not possible.

The problem of dynamic range in wideband multicarrier receivers is discussed in detail in "Receiver dimensioning in a hybrid multicarrier GSM base station". Harri Posti and Rauli Järvelä. IEE Personal Communications, August 1999. This paper proposes the use of three receivers; a high gain receiver, a low gain receiver and a narrowband receiver to overcome the dynamic range problem.

SUMMARY OF THE INVENTION

In accordance with a first aspect of the invention there is provided a method of receiving a wanted radio signal in the presence of an unwanted interference comprising monitoring the received signal to detect unwanted interference, calculating the frequency of the unwanted interference, adjusting the effective position in the frequency domain of at least one bandpass filter in the receiver to substantially exclude the unwanted interference from the passband of the bandpass filter.

In one embodiment, the receive circuit includes two parallel bandpass filter stages which are independently adjustable and wherein the adjusting step includes tuning the two bandpass stages to create a passband with a notch generally at the frequency of the narrowband interference.

In this way, it is possible to dynamically steer a rejection notch anywhere in the wideband receiver passband. The technique may use dual tunable intermediate frequencies (IFs) dynamically set by a controller that uses information on the interferering signal derived from a level detector and spare channelizer to set the synthesized local oscillators and the insertion of an attenuator.

Optionally, an attenuator is switchable into the signal path before the ADC in order to allow accurate quantisation of the unwanted interference. Such accurate quantisation by the ADC allows a subsequent DSP and the channelisers to accurately determine the magnitude, bandwidth and frequency of the interference. Ideally, the attenuator is chosen so that reception of the wanted signal is still possible whilst the attenuator is in place. The attenuator may also be used if the adjustment of the effective position in the frequency domain of the at least one bandpass filter is insufficient entirely to adequately attenuate the unwanted interference.

In another embodiment, the bandpass filter is adjusted to be adjacent but substantially not overlapping the narrowband interference. Thus, once unwanted interference (such as the carrier from a different mode of radio reception) is detected, the bandpass filter may be moved in the frequency domain so that the unwanted interference is either just above or just below the passband of the filter. This technique allows maximised reception of carriers adjacent to the interference whilst reducing the dynamic range requirements of the receivers circuit.

It should be noted that since filters do not have infinite attenuation capabilities, the effective moving the filter so that the carrier is no longer within the filter passband (in either aspect above) should be understood to mean that the filter produces sufficient attenuation of the unwanted interference to allow reception of the wanted radio signal.

In accordance with a second aspect, there is provided a wideband radio receiver including an IF stage having a bandpass filter, an ADC arranged to receive the output of the IF stage, a digital channeliser arranged to receive the output of the ADC, and an IF control arranged to adjust the effective position of the bandpass filter in the frequency domain responsive to signals detected by the channeliser.

Other aspects and features of the present invention will become apparent to those ordinarily skilled in the art upon review of the following description of the specific embodiments of the invention in conjunction with the accompanying figures.

BRIEF DESCRIPTION OF THE DRAWINGS

FIG. 1A is a schematic diagram of a prior art switched filter receiver;

FIGS. 1B–1D show the circuit of FIG. 1A in operation;

FIG. 4A is a schematic block diagram of an alternative receiver in accordance with the invention; and FIGS. 4B–4D show the circuit of FIG. 4A in operation.

DETAILED DESCRIPTION OF THE INVENTION

Figure 2:
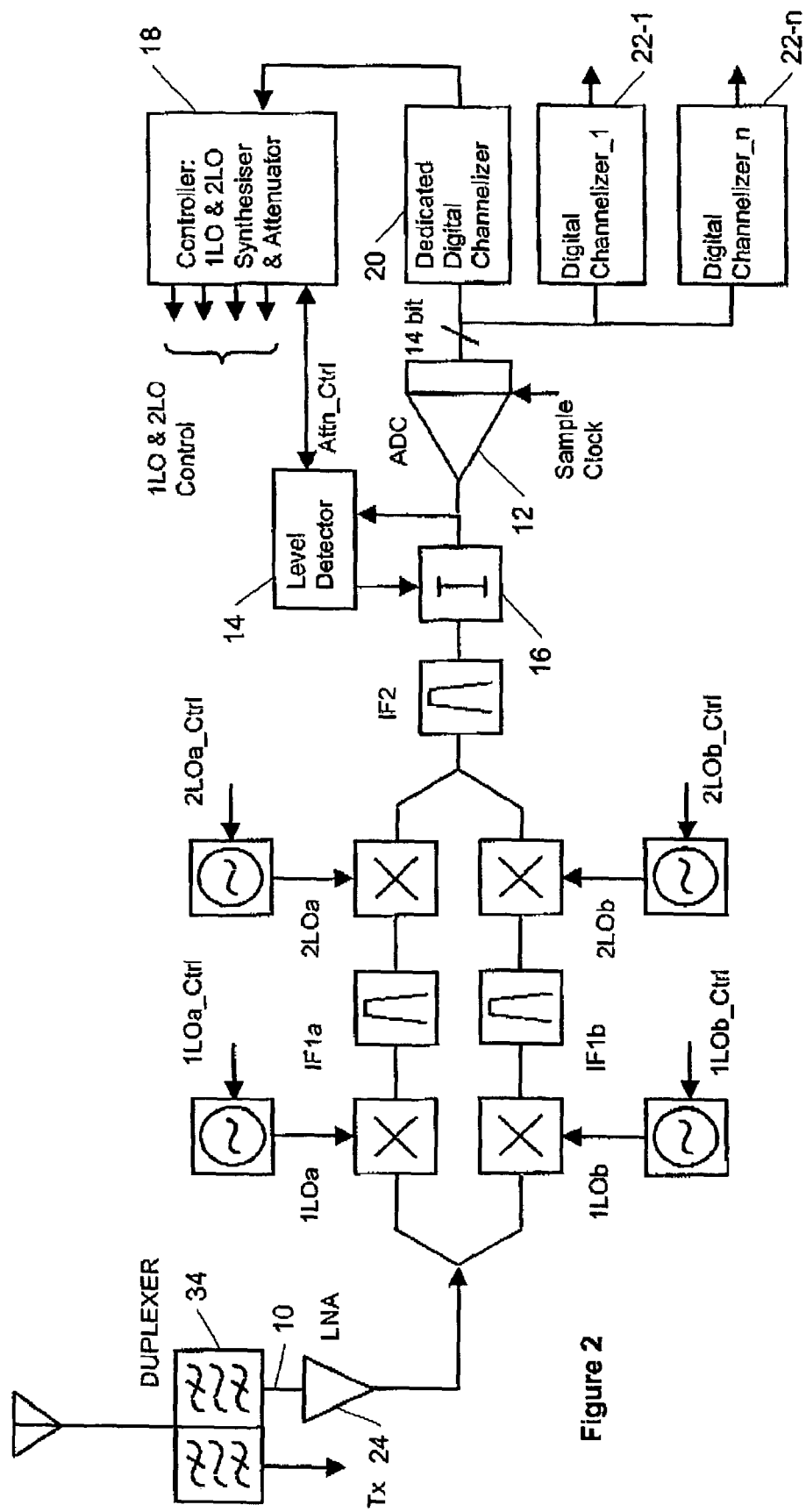
FIG. 2 is a schematic block diagram of a dual IF path double conversion receiver in accordance with the invention.

As noted above, wideband radio (or software defined radio) is a desirable goal since it allows re-use of a single receiver for multiple modes i.e. to allow a reception of signals such as cellular mobile radio signals transmitted according to different standards. The general principle is to have a receiver capable of receiving over a relatively wide range typically of the order of several tens of MHz. The received signal is then sampled using an analogue to digital converter and processed to isolate the separate channels (separate narrow portions of the received frequency spectrum) and to process those channels to extract transmitted data according to the appropriate transmission mode. Thus, the base station may be used to receive different modes simply by altering the processing algorithm which is performed on the data once it is sampled.

However, in order to meet the present standards it is necessary to be able to cope with high level interference whilst retaining sufficient resolution and noise floor to receive relatively low level "wanted" transmissions. This is described in more detail below. For wideband radio, these standards stretch the boundaries of present technology to its absolute limits. The problem typically is to achieve adequate dynamic range at the ADC. It will be appreciated that an ADC has a fixed range of digital values which it can output. Thus a 14 bit ADC can provide a digital representation of the voltage at its input using any one of $2^{14}$ (=16384) values. However it will be appreciated that typically, the least significant bit (LSB) of an ADC may not provide reliable results due to factors such as noise and internal inaccuracies in the analogue manufacture of the ADC (so-called "quantisation noise"). Accordingly therefore, once good design practice is applied, each ADC design will only be able to provide a particular dynamic range i.e. the level between which the ADC becomes saturated at its top end and can produce no further information about the signal and the level at which the signal is so low that the resolution of the ADC is insufficient to produce any useful information about the signal.

In practice, in the field of wideband radio (where an ADC may be required to provide 100 M sample/second) presently the dynamic range of ADCs is insufficient to be able accurately to receive high level interference (and therefore be able to accurately process the signal to remove the interference) and still retain sufficient resolution to be able to decode low level signals according to the required specifications. As noted above, one prior art solution as proposed in the Posti and Järvelä paper, is simply to provide two receivers, one for high level signals and one for low level signals (plus a narrowband receiver for GSM). The solutions proposed below avoid such duplication.

With reference to FIG. 1A, a conventional receiver is shown. The receiver has an antenna 2 a duplexer 4 and three switchable SAW bandpass filters 6-1, 6-2 and 6-3. The three SAW filters have bandwidths respectively of approximately one carrier's width, two carriers' width and three carriers' width. With reference now also to FIGS. 1B to 1D, in the presence of two high level narrowband interfering carrier signals from an alternative transmission mode (commonly termed "blockers") filter 6-1 is used and a single wanted carrier is received as shown in FIG. 1B. In the presence of more widely spaced blockers, a wider SAW filter may be switched in to allow reception of two carriers as shown in FIG. 1C. FIG. 1D shows the situation in which the interfering blockers are more widely spaced allowing reception of three carriers.

Importantly, it will be noted that in the presence of interference, wideband reception is not possible. Furthermore, in order to deal with interference, it is necessary to provide a plurality of relatively expensive filters and the means to switch between them. Thus this arrangement is not only relatively expensive but does not provide a wideband receiver.

In a first embodiment of the invention, two tunable bandpass intermediate frequency paths are connected in parallel to achieve two passbands with effectively a stopband notch between them under dynamic tuning control through the setting of four synthesized local oscillators 1LOa, 1LOb, 2LOa and 2LOb. Tuning of the LOs determines the position of the stopband notch.

Figure 3:
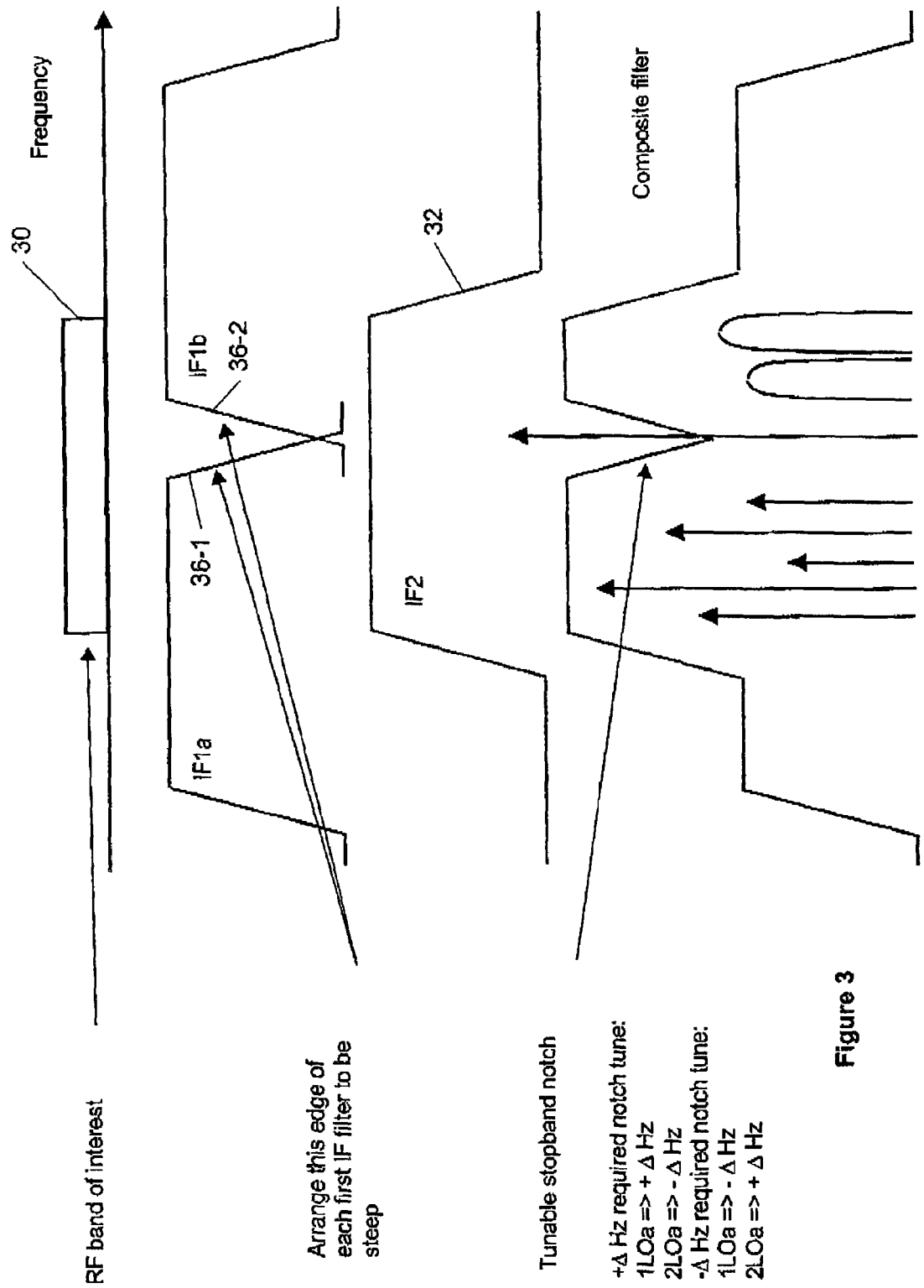
FIG. 3 is a frequency plan for the receiver of FIG. 2.

FIG. 2 shows how the combined dual IF path double conversion receiver chains are used to achieve two tunable passbands to provide a tunable rejection notch as shown in FIG. 3.

Initially, the receiver is in a quiescent state to create a single wideband IF. To achieve this, the synthesized first local oscillators 1LOa and 1LOb are set to the same frequency as each other, as are the second local oscillators 2LOa and 2LOb. This ensures that the intermediate frequency bands determined by IF filters IF1a, IF1b and IF2 exactly overlay each other.

When an interfering signal is incident at the receiver input 10 at a level such that at the ADC input 12 it is just below the clip level of the ADC, it is detected by a Level Detector circuit 14 and an 8 dB attenuator 16 is switched into the signal path. With this attenuator inserted, the maximum signal performance is improved sufficiently to cope with the "blocker" and still meet reference sensitivity. This is because the receiver is arranged to have sufficient margin on sensitivity to tolerate the degradation introduced by the attenuator insertion. Knowledge of the presence of the high level signal is passed from the Level Detector to a Controller 18.

The interfering signal is output from the ADC in digits along with the other signals in the IF bandwidth. A Dedicated Digital Channelizer 20 narrow band filters the interferer and the controller reads its frequency position so that the synthesized local oscillators 1LOa, 1LOb, 2LOa and 2LOb can be set by the controller 18 so that the resulting composite filter response of the receive chain is a wide passband with a rejection notch positioned on the interferer. The Digital Channelizers 22-1 to 22-$n$ filter the wanted signals in their respective channels and pass them onwards to a DSP for demodulation. The attentuator 16 may then be switched out.

It is envisaged that the first IF will be selected to be in the region of 400 MHz as this is an appropriate choice from the RF image rejection point of view, in that it allows the image rejection to be built into the design of the LNA 24 obviating the need for a separate image filter. 400 MHz is also an appropriate choice of first IF from the point of view of achieving a wide bandwidth of 20 MHz together whilst allowing asymmetric steepness customisation of filter transition region for filters IF1a and IF1b so that the notch has a steep response and is therefore as narrow as possible.

The second IF is typically selected to be in the region of 70 MHz as this is an optimum choice to achieve best signal to noise (SNR) performance from the ADC. The ADC is clocked at approximately 100 Msamples/sec. The selected frequency plan also enables the IF1 and IF2 filters to be implemented as SAW types.

The rejection notch is only steered during interference and reverts to the quiescent state when the interferers are below the threshold level of the Level Detector 14. In the case where additional blockers are incident at the receiver such that the extra one or more exceed the Level Detector threshold, then the 8 dB attenuator is switched into the signal path again. In this case, of multiple interferers above threshold, the receiver steers a rejection notch at the prime interferer and also reduces gain to deal with additional interference. However, in practice, it is rare to receive more than one high level interferer.

FIG. 3 shows the frequency plan for the interferer rejection wideband receiver. The band of interest 30 is typically set as 20 MHz. Within this band it may be desirable to receive narrowband GSM signals and also wideband UMTS signals in the presence of a strong inband interferer as illustrated.

The IF2 passband 32 sets the RF band of interest at 20 MHz, along with the front-end RF duplexer filter 34. The IF1$a$ and IF1$b$ filters are set slightly wider than IF2 so as not to degrade the bandwidth set by IF2. The IF1$a$ and IF1$b$ filters are designed to exhibit a steep transition region 36-1, 36-2 on alternate edges to achieve a narrow stopband region.

To meet the GSM format specification it is necessary to cope with a blocking signal of −25 dBm instantaneously prior to the steering of the rejection notch at the interferer. Therefore the technique detailed in FIG. 2 exhibits a level detector function that controls the insertion of an attenuator. This attenuator is set at a value to allow the blocking signal of −25 dBm to be handled whilst not degrading the receiver sensitivity beyond the reference sensitivity. As explained below.

Consider the PCS 1900 base station (BTS) blocker case with a −25 dBm blocker and a wanted signal at 3 dB above −104 dBm reference sensitivity, equal to −101 dBm as per 3GPP Technical Specification 05.05. Assume a 20 MHz RF and IF bandwidth up to the ADC.

For this application, the ADC input SNR is typically 72 dB and the receiver gain lineup from antenna to ADC is initially set at 40 dB. Maximum ADC input equivalent level is +10 dBm. So ADC dynamic range at the receiver input is as shown in Table 1.

TABLE 1

Rx Input Range vs Gain

| Rx Gain | Rx Input Range |
|---|---|
| 40 dB | −30 to −102 dBm |
| 32 dB (with 8 dB attenuator) | −22 to −94 dBm |

With a 40 dB receiver gain line-up from antenna to ADC the cumulative noise figure is 3.6 dB and with the 32 dB gain line-up it is 6.2 dB. At the receiver input the 6.2 dB noise figure represents a sensitivity of:

−174+10 log(20 MHz)+6.2=−94.8 dBm

Note that the 6.2 dB noise figure includes the ADC noise.

So in this case, the −101 dBm required signal sensitivity is submerged in the receiver noise in a 20 MHz bandwidth of −94.8 dBm. Now provided this broadband receiver noise is lifted to the level of the ADC quantization noise at the receiver input (which it is) then the wanted signal ran be retrieved in baseband processing by the filter bandwidth advantage 10 log(20 MHz/200 kHz)=20 dB. The effective noise will then be 20 dB down on −94.8 dBm at −114.8 dBm or 13.8 dB below the signal. This is usefully inside the 9 dB SNR required to demodulate GSM to the required bit error rate and thus the receiver can function accetpably even with the attenuator 16 switched in.

As described in the Posti and Järvelä article, the likelihood of a high level blocker is very low. For a typical urban deployment the simulation results reported in this article have the likelihood of received signal levels as shown in Table 2.

TABLE 2

Rx Input Range Statistics

| Amount of power | in Receiver Input Range |
|---|---|
| 99.80% | −110 to −45 dBm |
| 1.21% | −45 to −40 dBm |
| 0.07% | −40 to −15 dBm |
| 0.004% | >−15 dBm |

Thus a single notch will usually suffice. However, if an additional interferer is received, then the attenuator can be reinserted.

With reference to FIG. 4A, an alternative technique is shown. In this technique, instead of having two (or more) parallel IF stages, a single receive passband 40 is used. In normal usage, a signal is received at an antenna 42, passed through a duplexer 44 downmixed by mixer 46 to an intermediate frequency, passed through passband filter 40, sampled at ADC 48 and passed to a plurality of channelizers 50. After digital channelizing, the signal is passed on to a modern pool 52 typically implemented using one or more DSP. However, the circuit shown in FIG. 4A includes a variable frequency local oscillator 54 (typically a synthesized local oscillator).

During operation, typically one or more of the channelizers 50 are spare, in the sense that they are not being used to receive transmissions. Thus these spare channelizers can be used to tune into a blocking signal 56 (as shown in FIGS. 4B–4D) and determine its frequency.

In FIG. 4B, although a blocking signal is present, it is sufficiently far outside the passband of the receiver not to cause a problem. However in FIG. 4C, the blocker is within the passband and would normally cause saturation of the ADC 48. However, channelizers 5 and 6 are spare and are controlled to locate the frequency of the blocker 56'. Having located the blocker, the synthesized local oscillator 54 may be adjusted to move the effective passband of the receive circuit so that the blocker 56' is no longer in the passband and is instead attenuated by being in the transition band, as shown in FIG. 4D. This still allows reception of the four channels which were being received before the local oscillator was adjusted. Furthermore, this also still provides two spare channelizers to locate any further blocking signals.

In this way, similar advantages to those of the circuit shown in FIG. 2 are achieved without the use of additional parallel IF paths and their associated cost. However, it will noted that the trade-off for this reduction in cost is that the base station must choose whether to put the passband above or below the blocking signal and therefore lose the possibility of receiving channels on the other side of the blocking signal. For the example shown in FIG. 4D, any channels above the blocker 56' will no longer be received since they will be outside the passband of the receiver.

The invention claimed is:

1. A method of receiving a wanted radio signal in the presence of unwanted interference comprising:
   (a) monitoring the received signal to detect unwanted interference, the interference having a frequency lying in a first bandwidth,
   (b) calculating said first bandwidth, and
   (c) adjusting a passband in the frequency domain of at least one bandpass filter in the receiver to have a second bandwidth with a range of frequencies lying outside said first bandwidth in such a way as to substantially exclude the unwanted interference from the passband of the at least one bandpass filter;

wherein the receive circuit includes two parallel bandpass filter stages which are independently adjustable and wherein the adjusting step includes tuning the two bandpass stages to create a passband with a notch generally at the frequency of the unwanted interference.

2. A method according to claim 1, including switching an attenuator into the receive signal path when unwanted interference is detected and during the calculating step to avoid saturation in the receive circuit.

3. A method according to claim 1, wherein the adjusting step includes adjusting the bandpass filter to attenuate the unwanted interference by causing the unwanted interference to be outside the passband of the filter.

4. A wideband radio receiver including an IF stage comprising two parallel stages each having a bandpass filter and operable to produce a composite bandpass response having a notch by tuning the bandpass characteristics to be in adjacent and non-overlapping regions of the frequency domain, and an ADC arranged to receive the output of the IF stage, a digital channeliser arranged to receive the output of the ADC, and an IF control arranged to adjust the passband of the bandpass filter in the frequency domain responsive to signals detected by the channeliser, wherein the signals have a range of frequencies lying in a first bandwidth and the passband is adjusted to a second bandwidth having a range of frequencies lying substantially outside said first bandwidth.

5. A receiver according to claim 4, further including a switchable attenuator under control of the IF controller which is located before the ADC and arranged to prevent saturation of the ADC by interference when it is switched into the signal path.

6. A receiver according to claim 5, further including a switchable attenuator under control of the IF controller which is located before the ADC and arranged to prevent saturation of the ADC by interference when it is switched into the signal path.

7. A wideband radio receiver including an IF stage comprising two parallel stages each having a bandpass filter and operable to produce a composite bandpass response having a notch by tuning the bandpass characteristics to be in adjacent and non-overlapping regions of the frequency domain, and an ADC arranged to receive the output of the IF stage, a digital channeliser arranged to receive the output of the ADC, and an IF control arranged to adjust the passband of the bandpass filter in the frequency domain responsive to signals detected by the channeliser, the signals having a range of frequencies lying in a first bandwidth, and the passband being adjusted to a second bandwidth having a range of frequencies lying substantially outside said first bandwidth, and further including a digital signal processor for decoding the wanted radio signal to extract data in the signal.

8. A wireless network including at least one network node having a wideband radio receiver including an IF stage comprising two parallel stages each having a bandpass filter and operable to produce a composite bandpass response having a notch by tuning the bandpass characteristics to be in adjacent and non-overlapping regions of the frequency domain, and an ADC arranged to receive the output of the IF stage, a digital channeliser arranged to receive the output of the ADC, and an IF control arranged to adjust the passband of the bandpass filter in the frequency domain responsive to signals detected by the channeliser, the signals having a range of frequencies lying in a first bandwidth, and the passband being adjusted to a second bandwidth having a range of frequencies lying substantially outside said first bandwidth, and further including a digital signal processor for decoding the wanted radio signal to extract data in the signal.

9. A network according to claim 8 wherein the wireless network is a cellular radio network.

10. A network according to claim 8, wherein the network node is a cellular radio base station.

11. A computer program executable on a processor associated with a network node in a wireless network and arranged when executed to cause the network node to:

(a) monitor the received signal to detect unwanted interference, the interference having a frequency lying in a first bandwidth, (b) calculate said first bandwidth, and (c) adjust a passband in the frequency domain of at least one bandpass filter in the receiver to have a second bandwidth with a range of frequencies lying outside said first bandwidth in such a way as to substantially exclude the unwanted interference from the passband of the at least one bandpass filter;

wherein the receive circuit includes two parallel bandpass filter stages which are independently adjustable and wherein the adjusting step includes tuning the two bandpass stages to create a passband with a notch generally at the frequency of the unwanted interference.

\* \* \* \* \*